(12) United States Patent
Fischer et al.

(10) Patent No.: US 10,987,924 B2
(45) Date of Patent: Apr. 27, 2021

(54) METHOD FOR PRINTING AN IMAGE USING LIQUID INK

(71) Applicant: HEIDELBERGER DRUCKMASCHINEN AG, Heidelberg (DE)

(72) Inventors: Joerg-Achim Fischer, Laboe (DE); Nicklas Raymond Norrick, Heddesheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/578,470

(22) Filed: Sep. 23, 2019

(65) Prior Publication Data

US 2020/0094549 A1  Mar. 26, 2020

(30) Foreign Application Priority Data

Sep. 26, 2018  (DE) ............. 10 2018 216 412.6

(51) Int. Cl.
*B41J 2/045* (2006.01)
*B05C 11/10* (2006.01)
*G05D 7/06* (2006.01)

(52) U.S. Cl.
CPC ....... *B41J 2/04573* (2013.01); *B05C 11/1034* (2013.01); *B41J 2/04535* (2013.01); *B41J 2/04586* (2013.01); *G05D 7/0623* (2013.01)

(58) Field of Classification Search
CPC ...... B41J 2/17596; B41J 2/17556; B41J 2/18; B41J 2/04573; B41J 2/045; B41J 2/175; B41J 2/04535
See application file for complete search history.

(56) References Cited

U.S. PATENT DOCUMENTS

| | | | |
|---|---|---|---|
| 4,639,736 A | 1/1987 | Jochimsen |
| 6,672,702 B2 | 1/2004 | Sadasivan et al. |
| 7,083,260 B2 | 8/2006 | Song |
| 7,455,377 B2 | 11/2008 | Espasa et al. |
| 7,641,323 B2 | 1/2010 | Nagashima |
| 7,841,706 B2 | 11/2010 | Ishinaga et al. |
| 8,460,448 B2 | 6/2013 | Matsunaga et al. |
| 2006/0215000 A1 | 9/2006 | Kachi |
| 2008/0007587 A1 | 1/2008 | Watanabe |
| 2008/0238980 A1 | 10/2008 | Nagashima et al. |

FOREIGN PATENT DOCUMENTS

| | | |
|---|---|---|
| CN | 86105674 A | 7/1987 |
| CN | 1326472 A | 12/2001 |
| CN | 1496832 A | 5/2004 |
| CN | 102939349 A | 2/2013 |
| DE | 112006000579 T5 | 5/2008 |
| EP | 1369236 A2 | 12/2003 |
| JP | 2006103004 A | 4/2006 |

*Primary Examiner* — Kristal Feggins

(74) *Attorney, Agent, or Firm* — Laurence A. Greenberg; Werner H. Stemer; Ralph E. Locher

(57) ABSTRACT

A method for printing an image with improved printing quality using liquid ink includes using a pump to pump ink to a print head for printing rows of the image onto a moving printing substrate. A respective value correlated with the amount of ink required to print the rows is calculated for a plurality of individual rows or a plurality of grouped rows of the image. The pump receives a preemptive control signal based on the calculated values.

8 Claims, 6 Drawing Sheets

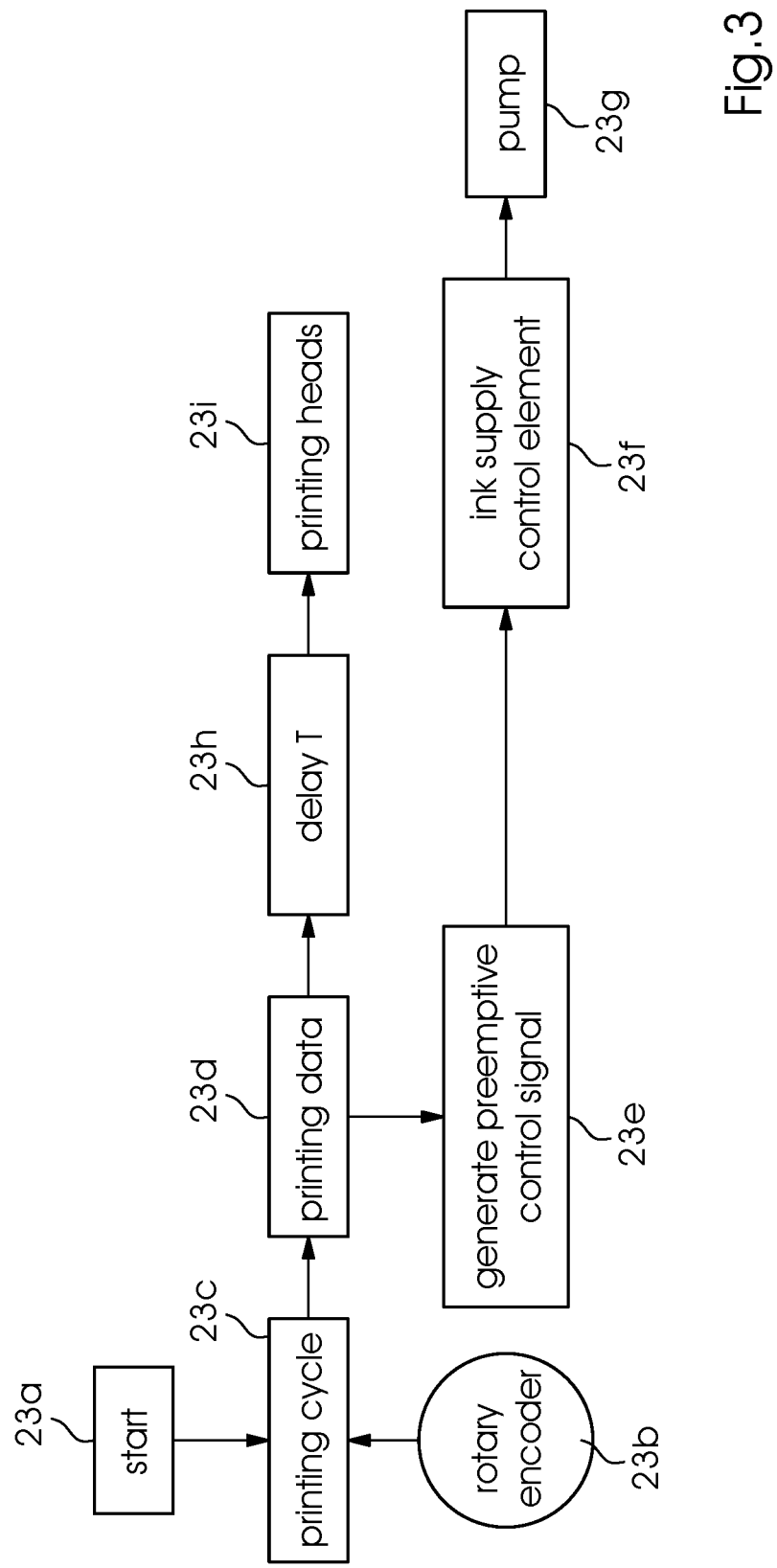

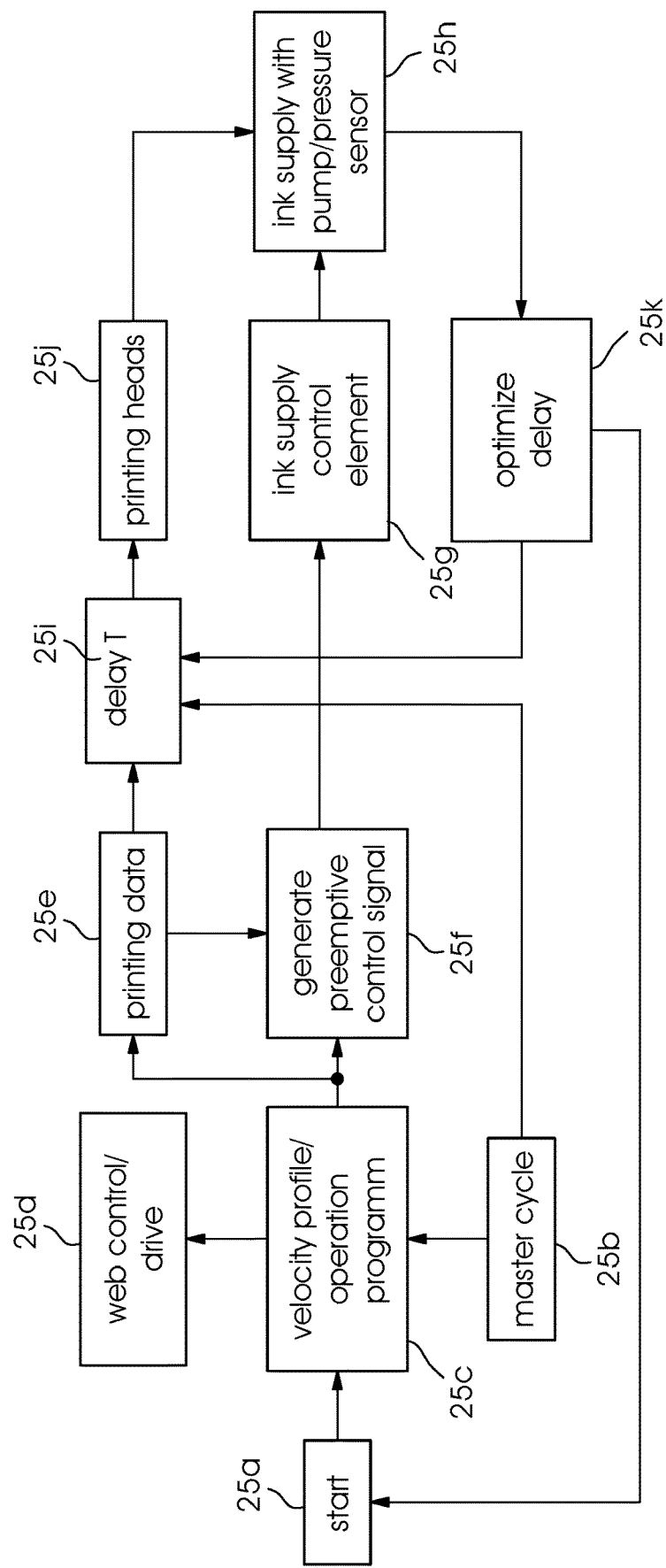

METHOD FOR PRINTING AN IMAGE USING LIQUID INK

CROSS-REFERENCE TO RELATED APPLICATION

This application claims the priority, under 35 U.S.C. § 119, of German Patent Application DE 10 2018 216 412.6, filed Sep. 26, 2018; the prior application is herewith incorporated by reference in its entirety.

BACKGROUND OF THE INVENTION

Field of the Invention

The invention relates to a method for printing an image with liquid ink, in which a pump is used to pump the ink to a print head and rows of the image are printed by the print head onto a moving printing substrate.

Description of the Related Art

The technical field of the invention is the graphic industry and in particular the field of industrial inkjet printing on flat substrates, i.e. the application of liquid ink to a printing substrate.

In the known DOD (drop-on-demand) ink printing methods, liquid ink is applied and a print is created on a flat printing substrate by a print head (referred to as a head for short) with individually controllable nozzles that generate tiny ink droplets, preferably in a picoliter range, and transfer them to the printing substrate in a touch-free way as print dots in accordance with the image to be printed. The nozzles may be actuated by piezoelectric actuators.

In inkjet printing processes with a circulation ink supply, liquid ink is supplied to print heads, generally by using at least one pump. As the ink is pumped, a difference between the (high) ink volume flow towards the head and the (low) ink volume return flow away from the head corresponds to the ink volume that the print head has applied to the substrate.

Sudden print image changes may lead to sudden changes to the ink volume that is applied, a fact which may cause undesired pressure drops in the ink supply and print quality deterioration due to dead times of the pump.

A known countermeasure is to build in sufficient hydraulic capacity at suitable locations to stabilize pressure in the liquid ink. However, that requires additional installation space.

Another known measure is to apply a preemptive control signal dependent on the print image change to the pump for the pump to compensate an expected pressure drop by a corresponding timely compensatory pressure build-up.

SUMMARY OF THE INVENTION

It is accordingly an object of the invention to provide a method for printing an image using liquid ink, which overcomes the hereinafore-mentioned disadvantages of and is an improvement over the heretofore-known methods of this general type and which, in particular, allows the quality of the print to be further improved.

With the foregoing and other objects in view there is provided, in accordance with the invention, a method for printing an image using liquid ink, which includes using a pump to pump the ink to a print head and using the print head to print rows of the image onto a moving printing substrate, in which for multiple individual rows or for multiple rows forming a group of rows of the image, a value correlated with the amount of ink required to print the rows is calculated and the pump receives a preemptive control signal based on the calculated values.

Advantageous and thus preferred further developments of the invention will become apparent from the dependent claims as well as from the description and drawings. The features of the invention, of the further developments of the invention, and of the exemplary embodiments of the invention may be combined with one another and such combinations also represent advantageous further developments of the invention.

The invention advantageously provides an even further improved printing quality.

A special advantage of the invention may be seen in the fact that not only is it possible to provide preemptive ink control to counteract ink pressure changes when print images change but also to recognize ink consumption fluctuations, even line-by-line fluctuations, within a print image and to compensate for them by preemptive control to provide considerable printing quality improvements.

In accordance with the invention, preemptive control may be provided for continuous as well as for discontinuous fluctuations.

The values required for preemptive control may be created in advance by a computer and saved in a memory to be ready for use or they may be generated and used "on the fly."

A "printing substrate" is understood to mean flat substrates that are unprinted and provided to be printed on or have already been printed and are provided to receive further prints and further treatment (if desired), especially folds. A "printing substrate" in particular refers to flat substrates in the shape of sheets or webs substantially made of paper, cardboard, paperboard, corrugated board, plastic, or metal, in particular plastic foil or metal foil, or in the shape of labels substantially made of paper or plastic, in particular on a carrier web, or in the shape of webs substantially made of natural or artificial fibers, in particular textile webs such as webs of cloth or fabric. The printing substrate is preferably used for commercial, label and/or packaging printing.

Preferred further developments of the invention may be distinguished by one or more of the combinations of features listed below:
- A matrix corresponding to the image and including rows of entries of drop sizes may be used for the calculation and row totals may be formed.
- The drop sizes may be weighted with associated predefined ink drop volumes.
- A delay between the instant of transmitting the preemptive control signal to the pump and the instant of transmitting a control signal to the print head may be calculated.
- The delay time may be calculated as a function of a constant or variable printing substrate transport speed.
- The delay may be optimized by printing and analyzing a test element.
- The pump may generate a liquid pressure in the ink.
- Two, three, four, or five rows may be grouped together.

Other features which are considered as characteristic for the invention are set forth in the appended claims.

Although the invention is illustrated and described herein as embodied in a method for printing an image using liquid ink, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2A is a section of a print illustrating saved digital data and a calculation of values;

FIG. 2B is another section of a print illustrating saved digital data and a calculation of values;

FIGS. 3 and 4 are flow diagrams illustrating exemplary embodiments of the invention with a delay;

FIG. 6 is a flow diagram illustrating exemplary embodiments of the invention with an optimized delay.

DETAILED DESCRIPTION OF THE INVENTION

Figure 1:
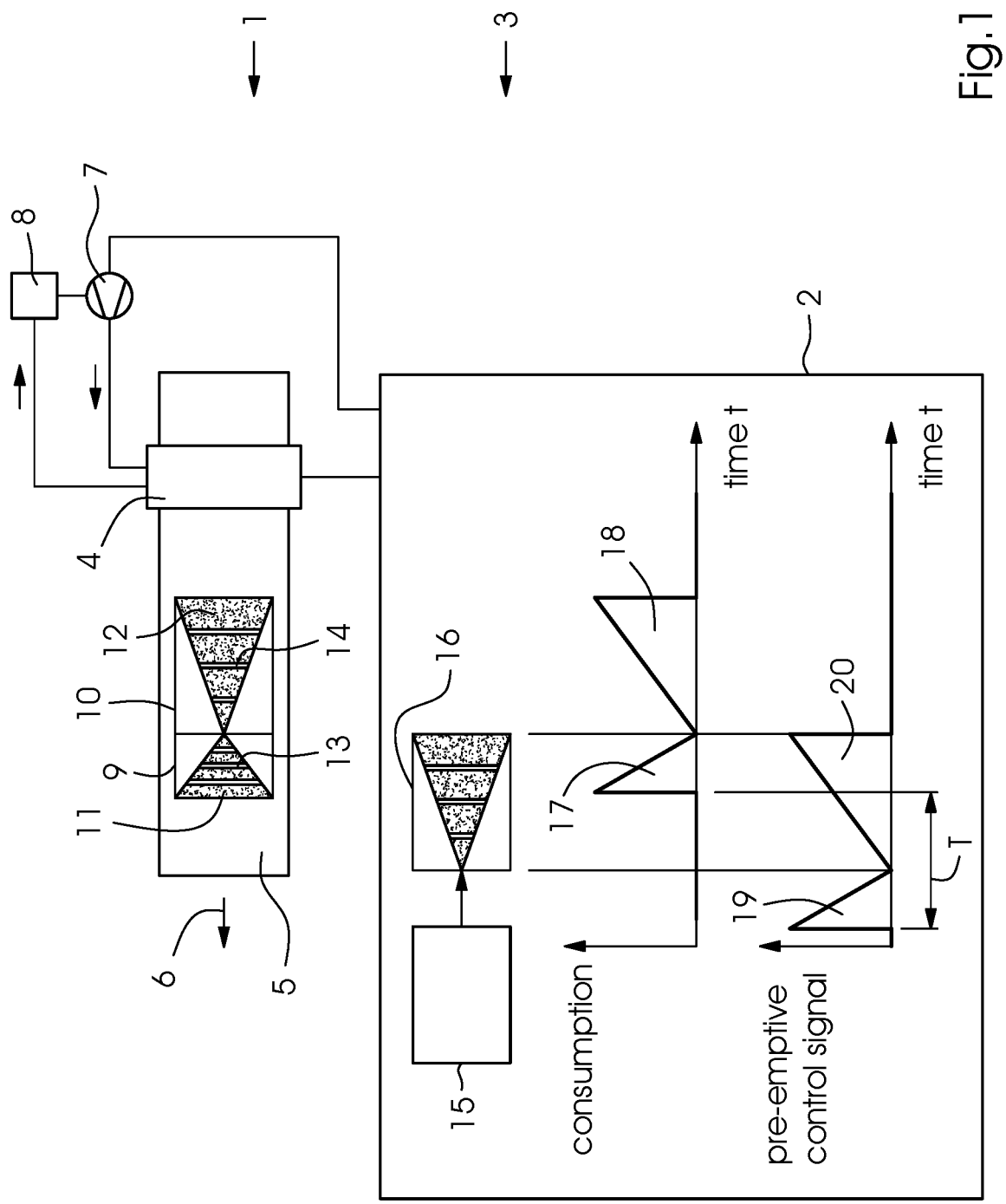
FIG. 1 is a block diagram of a system for implementing the method of the invention.

Referring now to the figures of the drawings in detail and first, particularly, to FIG. 1 thereof, there is seen an ink printing machine 1 and a digital computer 2. Together, they form a system 3 for implementing a preferred embodiment of the method of the invention.

The ink printing machine 1 includes an inkjet print head 4 for digitally printing on a moving printing substrate 5. The print head is preferably page-wide, i.e. at least as wide as a printing substrate, and may include a plurality of adjacent ("stitched") individual heads. Every individual head is preferably a so-called drop-on-demand (DOD) print head for applying liquid ink. The printing substrate is moved/transported in a direction 6 and may preferably be made of paper, cardboard, or a plastic foil (in sheet or web shape). Alternatively, objects (of any desired shape) or rather the surfaces thereof may be printed on.

The ink printing machine 1 includes an ink pump 7 and an ink container 8. Together with ink lines, they form an ink supply system, preferably an ink circulation device. The ink pump pumps the liquid ink from the container to the print head (forward flow). In addition, there may be a return pump between the print head and the ink container.

The print head 4 and the ink pump 7 are controlled by the computer 2, which may be achieved by using the indicated control lines or in a wireless way.

FIG. 1 shows prints 9 and 10 that are created on the printing substrate 5. By way of example, the print 9 has a color wedge 11 and the print 10 has a color wedge 12. Every color wedge includes printed rows (perpendicular to the direction 6) only some of which are shown, namely a row 13 of the print 9 and rows 14 of the print 10. Successive rows (preferably up to five successive rows) may be grouped to form groups of rows 13 and groups of rows 14.

The computer 2 has an image memory 15 for digitally storing print data of prints 9 and 10. The computer further includes a buffer 16 into which digital prints 9 and 10 may be uploaded. Alternatively, the buffer may be a region of the image memory. In accordance with another alternative, the digital images or rather the print data thereof may be taken from a serial data stream. The computer forwards the digital images or rather the print data thereof to the print head 4.

The buffer is used to calculate a so-called preemptive control signal as a corrective signal in a computer-assisted way. The computer 2 transmits the preemptive control signal to the pump 7. A so-called delay T is observed between the transmission of the preemptive control signal to the pump by the computer and the transmission of the print data to the print head. The preemptive control signal is a high-resolution preemptive control signal that preferably factors in row-by-row changes of the ink volume that is required for the printing operation.

In the illustrated example, print data of the image 10 have been loaded into the buffer 16. Two diagrams are shown below the buffer to illustrate the calculations made by the computer 2.

The upper diagram shows the current ink consumption at the print head 4 (plotting the amplitude of the consumption over time t): a first consumption peak 17 corresponds to the print 9 printed first and a second consumption peak 18 corresponds to the following print 10. The peaks result from the wedge-shaped layout of the prints, which is just an example. Such peaks would cause extreme pressure changes in the liquid ink that is provided and would thus lead to quality deterioration in the prints. This is what the invention counteracts.

The lower diagram shows first and second preemptive control signals 19, 20 that the computer 2 has calculated for the respective prints on the basis of the digital print data of the prints 9, 10. The diagram shows that the preemptive control signals occur at a predefined or calculated delay T before the consumption peaks on the time axis. In order to make high-resolution calculations of the preemptive control signals for the prints 9, 10, the computer 2 analyzes the prints in accordance with their rows 13 and 14.

Figures 2A, 2B:
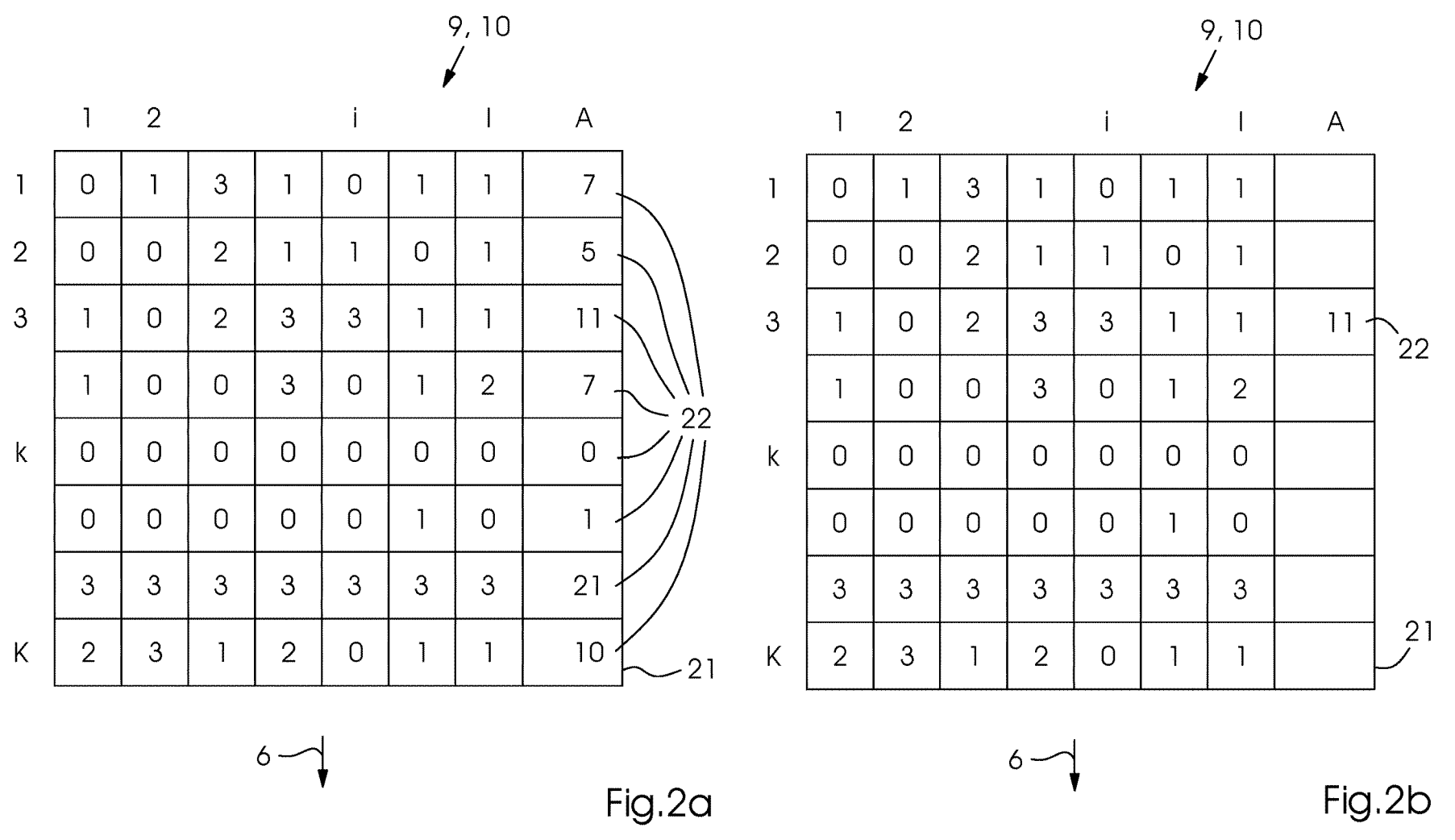

FIGS. 2A and 2B illustrate a respective section of a print 9 or 10 or rather the digital print data thereof in the form of a respective matrix 21 saved on the computer 2. The following applies:

i is the number of the row (between 1 and I),
k is the number of the column (between 1 and K),
the matrix entry n at (i, k) is the drop size,
the additional column vector A has entries $A_i$ indicating the row total of the drop sizes correlating with the amount of ink required to print the row.

The examples shown in FIGS. 2A and 2B are based on drop sizes 0, 1, 2 and 3 (no drop, small drop, medium drop, large drop). Drop sizes 0 to 3 may indicate the respective ink volume of the drop, i.e. a type 2 drop may have twice as much ink as a type 1 drop, for instance.

Once they have been calculated, entries $A_i$ and the corresponding values 22 are available as row-by-row preemptive control signals for the pump 7. Alternatively, values 22 may be subjected to further computing processing and converted into suitable values before the preemptive control signal is transmitted. In the example shown in FIG. 2A, a total is calculated for a number of rows or preferably for all rows and the calculated totals 22 (or $A_i$) are kept at hand for preemptive control operations at a later time. In the alternative example shown in FIG. 2B, only one respective row is totaled and the value 22 is promptly used for preemptive control. Then the next row is totaled.

When the values 22 are calculated, they may be weighted, for instance in the following way: drop size 0 corresponds to 0 picoliters, 1 corresponds to 3 picoliters, 2 corresponds to 5 picoliters, and 3 corresponds to 7 picoliters. Value $A_3$ in FIG. 2B would be weighted in accordance with the example and would therefore equal 28 (picoliters). Other picoliter values are possible, too.

For preemptive control purposes, i.e. for the generation of the amplitude of the preemptive control signal, the row totals $A_i$ are preferably forwarded to a D/A converter, which creates a D/A converter value. The latter is provided with a factor that contains the printing flow/printing pulse and the pumping flow. The final value is preferably added as a preemptive control signal to the control voltage of the pump (or pumps) in the circulation ink supply system 7 and 8. The preemptive control signal is preferably timed in accordance with the printing cycle.

The printing data are preferably delayed relative to the starting point of the preemptive control signal or the delay signal is generated using the printing cycle and a shift register or counter. The delay is preferably generated using a constant (a stable quantity defining the frequency or other time, with a shift register or counter).

Figure 4:
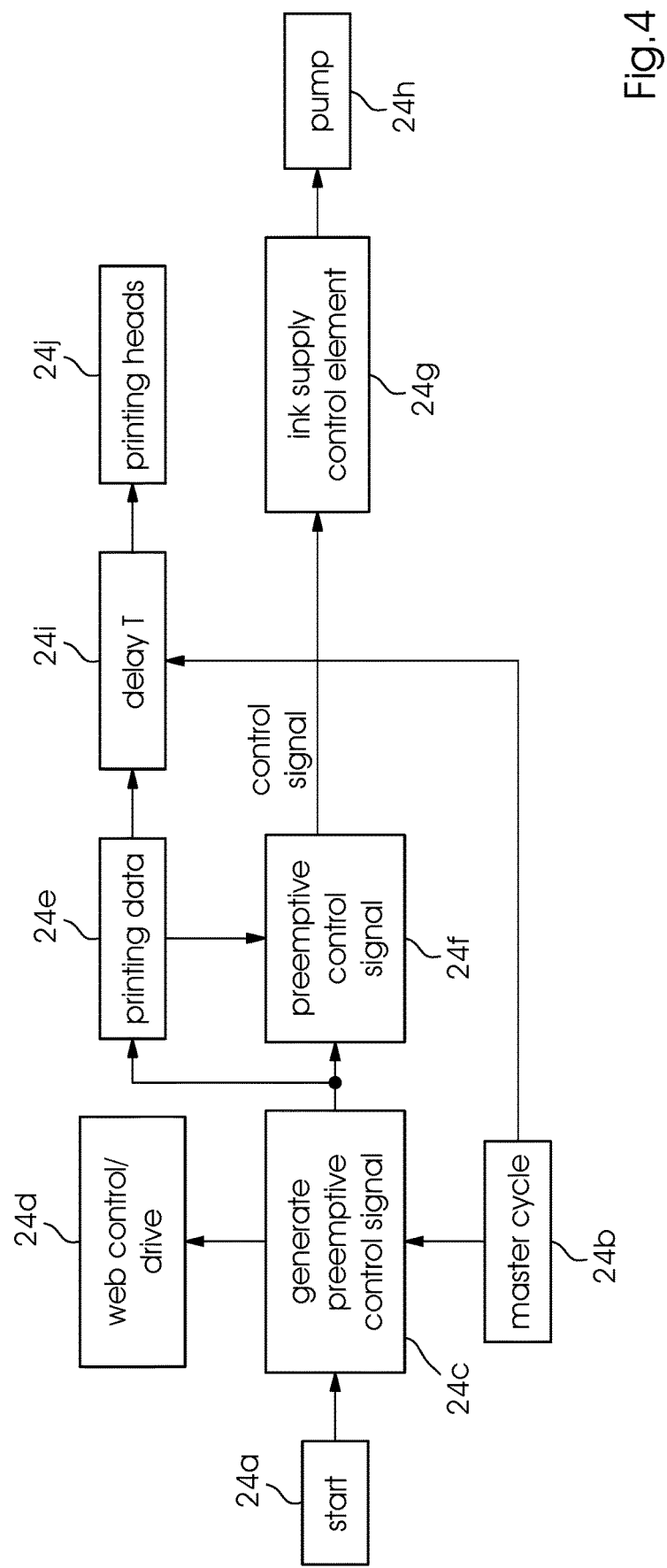
Figure 5:
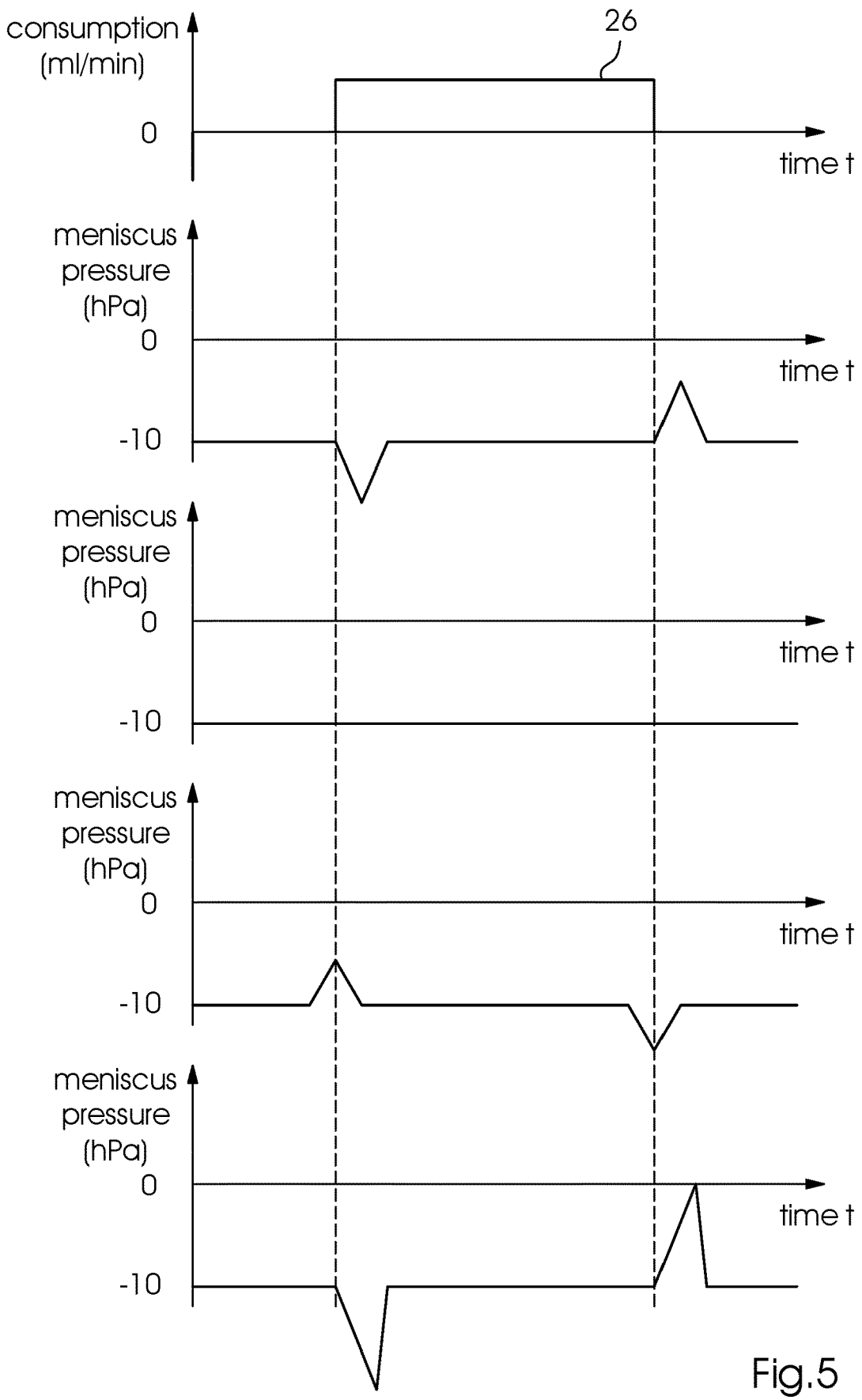
FIG. 5 is a group of diagrams for determining and optimizing the delay.

FIGS. 3 to 5 illustrate exemplary embodiments of the invention for different systems 3 with different requirements in terms of the delay between preemptive control and printing operation.

In all three examples, the preemptive control signals are generated in such a way that they are at hand and may be transmitted to the pump 7/the control unit thereof before the print heads 4 are actuated using the data corresponding to the preemptive control signal.

Printing data that are not available until the very last moment, for instance variable data such as the printing time cannot be factored in for preemptive control, not even in the case of high-resolution preemptive control in accordance with the invention. Such data may be dealt with using known values (e.g. averages) such as 50% of the ink volume flow. Such data ought not to take up too much space on the print image.

FIG. 3 illustrates preemptive control including steps 23a to 23i in accordance with the invention for a system 3 with a constant printing speed.

The method starts at step 23a. A rotary encoder (not illustrated in FIG. 1) of the printing machine 1 provides signals (step 23b) that may be used to determine a printing cycle (step 23c). The printing data for the prints 9 or 10 are at hand (step 23d). In accordance with the invention, they are used to calculate a preemptive control signal $A_i/22$ (step 23e), which is transmitted to a control element of the ink supply system 7, 8 (step 23f). The control element actuates the pump 7 (step 23g). A delay T is calculated (step 23h) and the printing data are transmitted to the print heads 4 (step 23i) after the delay T.

An example: at the beginning, the print data are provided in a memory medium 15 or 16. The printing position on the printing substrate 5 is known. Due to rotary encoders provided in the printing machine 1, locations, the beginning of the print, and other positions (some of them relative) are preferably known. A constant period of time, namely the delay T between the printing data and a fictitious point in time/place is easily implemented. If the speed is constant, place and time increments are equivalents. With the aid of an upstream (fictitious or actually printed) start mark, delays may be set without any further problems. If the upstream start mark is placed 500 mm upstream of the print position of the prints 9 or 10, (variable) delays of up to 1000 milliseconds are possible at printing speeds of 0.5 m/sec. The delay T may, for instance, be in the form of slide register data of the column vector A of the preemptive control signal and is made available before the print data of the prints 9 or 10 to be able to implement the required delay. The column vector A of the preemptive control signal needs to include at least one element 22. This element may be converted to a preemptive control signal in synchronism with the printing speed. It is preferably generated in time for the delay T indicated above to be set. In the simplest case, the delay T may be a number in the register that is counted down with the printing cycle and starts the printing operation (i.e. causes the print heads to print using the printing data). If a vector A having more than one element 22 is created to generate the preemptive control signal, the processes of creating the vector and of providing the cycle may be uncoupled. There are known methods to fall back on for this purpose, for instance two registers that are loaded and timed in an alternating way. The location-related printing cycle, which may be obtained from a location-related rotary encoder signal, for instance, may thus be used as the cycle for generating the delay T. A prerequisite for this is that the printing speed has already been reached when the preemptive control signal is generated.

FIG. 4 illustrates preemptive control including steps 24a to 24j in accordance with the invention for a system 3 with a variable printing speed.

The speed may vary when the printing machine 1 is started up or stopped (acceleration or deceleration of the printing substrate 5). In such a process, the speed (and thus the acceleration) may be known, for instance set by the computer, or it may be detected using sensors, e.g. rotary encoders, and made available on the computer 2.

The preemptive control signal may be construed by using the so-called color profile of the printing machine 1.

The method starts at step 24a. A (master) cycle is defined (step 24b). A velocity profile or a printing substrate transport program for the printing machine 1 is defined or determined (step 24c). This is the basis for controlling the drive for driving the printing substrate transport system (step 24d). The printing data of the prints 9 or 10 are at hand (step 24e). In accordance with the invention, the printing data are used to calculate a preemptive control signal $A_i/22$ (step 24f) (factoring in the velocity profile or printing substrate transport program), which is transmitted to a control element of the ink supply system 7, 8 (step 24g). The control element actuates the pump 7 (step 24h). The delay T is calculated (step 24i) while factoring in the (master) cycle, and after the delay, the print data are transmitted to the print heads 4 (step 24j).

An example: when the printing speed changes, the delay T preferably needs to be maintained. A direct derivation of the delay from the printing cycle and thus from the rotary encoder signal is thus not possible. The cycles for printing are basically "location-synchronous" cycles, while the required delay is a constant. Therefore, the invention proposes the following: if the printing speed is not constant, a velocity profile is preferably defined for the printing operation. This velocity profile is preferably used to derive a printing cycle (v_printing (t)=> printing cycle (t)). This is a fixed function that defines the location relation of the print data. The printing cycle function made available in this way is then preferably used to generate a preemptive control function that runs before the printing cycle function in terms of time. The offset in time is the delay T indicated above: preemptive control signal (t)=> printing cycle (t+T). In this case, there is no rotary encoder (for creating the cycle). The printing substrate speed preferably follows a control unit.

FIG. 5 illustrates five diagrams that show how the delay T between preemptive control of the pump 7 and the actuation of the print head 4 may be determined and optimized (if necessary).

From top to bottom, the diagrams illustrate the printing of a test element (e.g. a print strip) and the ink consumption (ink flow) required for this purpose, the meniscus pressure (pressure in the liquid ink at the nozzle openings of the print head) without preemptive control and with pressure peaks at the beginning and end of the ink flow; the meniscus pressure with optimized preemptive control; the meniscus pressure when the preemptive control is too early and the meniscus pressure when the preemptive control is too late.

An example: as described above, the delay ought to be adapted in a relatively accurate way to provide effective correction. This is possible with the aid of the optimization process described below. For this purpose, an image with an optimization print strip is printed. During the printing operation, the delay T is varied between a minimum and a maximum, for instance. At the same time, the pressure signal is analyzed. The optimum delay is achieved when the pressure deviation is minimized. In a test print, the precise instants of the printing pulses and ink flow (start of image and end of image, respectively) are known. By integrating the printing pulse signals with the instants of ink flow change and by scanning the then integrated signal, signals are obtained that are either more negative or more positive than the meniscus pressure. From the direction change one may draw conclusions as to the effect of the delay. The direction reverses with the ink flow change (at the end of the print strip). This allows the delay T to be set in an unequivocal way. A characteristic curve may be construed: signal=f (T). When the signal becomes zero the optimum delay has been set. The (optimization) print strip may be integrated into a conventional print control strip. The following may be envisaged: optimizing the delay by using the printing strip and by analyzing the pressure signal at the pressure sensors that are provided; determining the optimum delay by minimal pressure deviation at the beginning of printing; determining the optimum delay by minimal pressure deviation at the end of printing; saving the delays as default values for starting the optimization; dynamically controlling the delay during printing by continuously making adjustments to obtain the absolute minimum (overshooting/undershooting of the printing pulses); and/or switching off the control (optimization) of the delay during printing when the print flow fluctuation is below a defined threshold. The method may be executed in a fully automated way.

FIG. 6 illustrates preemptive control including steps 25a to 25k in accordance with the invention for a system 3 with delay optimization during the printing operation, e.g. due to undesired drifting of the delay.

The method starts at step 25a. A (master) cycle is defined (step 25b). A velocity profile or a printing substrate transport program for the printing machine 1 is defined or determined (step 25c). This is the basis for controlling the drive for driving the printing substrate transport system (step 25d). The printing data for the prints 9 or 10 are at hand (step 25e). In accordance with the invention, they are used to calculate a preemptive control signal $A_i/22$ (factoring in the velocity profile or transport program) (step 25f), which is then transmitted to a control element of the ink supply 7, 8 (step 25g). The control element actuates the pump 7 (step 25h). The delay T is calculated (step 25i) while factoring in the (master) cycle and the result of an optimization (step 25k), and after the delay, the print data are transmitted to the print heads 4 (step 25j). The optimization falls back on data from step 25h (provided by sensors).

An example: when the delay T that has been set is no longer the optimum delay because of so-called drifting, signal deviations (meniscus fluctuations) occur. This would be a sign that the delay T needs to be corrected. For this purpose, the process described above would be reinitiated. A direct change of the delay T during printing is likewise conceivable. However, some compromises would be required to do this and a small residual error would potentially have to be accepted. For instance, in a phase in which no printing takes place, an error that may not be eliminated immediately after the start of the printing operation may build up. The delay T (referred to as drift) must not change more quickly than the delay T itself. A potential solution may be: the meniscus pressure deviation delta_pm from the ideal value zero is used to calculate the correction value delta_T, where T_new=T_old+delta_T and delta_T=delta_pm*F. The factor F has been determined in an empirical process and has the unit s/hPa (the algebraic sign of factor F depends on the direction of the ink flow change). Based on the image to be printed, specific scan points where the correction is made are computationally selected: 1) ideally, these specific points are major ink flow changes; 2) ideally, the changes should be of the same magnitude; 3) ideally, the changes should occur frequently; 4) FIG. 5 shows that the effectiveness of the delay may be evaluated at the positive and negative flanks of the print flow change. The direction of the change (positive or negative) is important for the evaluation; 5) subsidiarily, both directions of change may be used, resulting in a greater probability of obtaining corrective data; 6) subsidiarily, a number of groups of changes having a total which forms a corrective value may be formed within a time phase of different length.

Out of multiple corrective values, the value that is closest in time may be used.

Ideally, the transmission function of the control path with $G_s(s)$ as the function is known for the preemptive control process. In an optimum case, the transmission behavior $G_{VS}(s)$ of the preemptive control process corresponds to the reciprocal value of the transmission function of the control path:

$$G_{VS}(s) = \frac{1}{G_s(s)}$$

The weighting takes place in the frequency range, i.e. if the ink pumps do not react in a sufficiently dynamic way, they act like a low-pass filter. When this filter characteristic is known, the preemptive control signal may be distorted in the frequency range with the inverse filter characteristic to provide an optimum signal to the pumps. If the path behavior in the frequency range is not known, at least a scaling of the preemptive control signal needs to take place to translate the ink flow signal (unit: ml/min) into a meniscus pressure deviation (unit: mbar).

LIST OF REFERENCE SYMBOLS 1 ink printing machine
2 digital computer
3 system
4 inkjet print head
5 printing substrate
6 direction of transport 7 ink pump
8 ink container
9 print image
10 print image
11 color wedge
12 color wedge
13 rows
14 rows
15 image memory
16 buffer
17 first consumption peak
18 second consumption peak
19 first preemptive control signal
20 second preemptive control signal
21 matrix
22 values
23a to 23i steps of the method
24a to 24i steps of the method
25a to 25k steps of the method
26 test element
$A_i$ values
T delay

The invention claimed is:

1. A method for printing an image using liquid ink, the method comprising the following steps:
 using a pump to pump the ink to a print head;
 using the print head to print rows of the image onto a moving printing substrate;
 calculating respective values correlated with an amount of ink required for the rows for a plurality of individual rows or for a plurality of grouped rows of the image;
 preemptively controlling the pump with a preemptive control signal based on the calculated values;
 recognizing line-by-line ink consumption fluctuations within a print image; and
 preemptively controlling the pump with a preemptive control signal based on the line-by-line ink consumption fluctuations.

2. The method according to claim 1, which further comprises using a matrix corresponding to the image for the calculation, including rows of entries of drop sizes in the matrix, and calculating row totals.

3. The method according to claim 2, which further comprises weighting the drop sizes with associated predefined ink drop volumes.

4. The method according to claim 1, which further comprises calculating a delay between an instant of transmitting the preemptive control signal to the pump and an instant of transmitting a control signal to the print head.

5. The method according to claim 4, which further comprises calculating the delay as a function of a constant or variable printing substrate transport speed.

6. The method according to claim 4, which further comprises optimizing the delay by printing and analyzing a test element.

7. The method according to claim 1, which further comprises using the pump to create a liquid pressure in the ink.

8. The method according to claim 1, which further comprises grouping two, three, four or five rows together.

* * * * *